US008783064B2

(12) United States Patent
Lesche

(10) Patent No.: US 8,783,064 B2
(45) Date of Patent: Jul. 22, 2014

(54) METHOD AND APPARATUS FOR REMOVING THE GLASS MOULD JOINTS INCLUDING POLISHING THE JOINTS, AND GLASS PRODUCT MACHINED THEREBY

(75) Inventor: Klaus Lesche, Kirchberg (DE)

(73) Assignee: Zwiesel Kristalliglas AG, Zwiesel (DE)

( * ) Notice: Subject to any disclaimer, the term of this patent is extended or adjusted under 35 U.S.C. 154(b) by 753 days.

(21) Appl. No.: 12/393,151

(22) Filed: Feb. 26, 2009

(65) Prior Publication Data

US 2009/0217707 A1    Sep. 3, 2009

(30) Foreign Application Priority Data

Feb. 29, 2008   (DE) .......................... 10 2008 011 808

(51) Int. Cl.
*C03C 19/00* (2006.01)
*B24B 37/02* (2012.01)
*B24B 33/06* (2006.01)

(52) U.S. Cl.
CPC ................. *B24B 37/02* (2013.01); *B24B 33/06* (2013.01); *C03C 19/00* (2013.01)
USPC ........... 65/61; 65/65; 65/252; 65/284; 65/285

(58) Field of Classification Search
CPC ........ C03B 29/00; C03B 19/00; B24B 13/00; B24B 29/00; B24B 37/005; B24B 33/06; H01L 33/20
USPC .................. 65/61, 63–65, 119, 252, 284–285
See application file for complete search history.

(56) References Cited

U.S. PATENT DOCUMENTS

| | | | | |
|---|---|---|---|---|
| 2,289,999 | A | * | 7/1942 | Schutz ............................ 65/156 |
| 3,737,293 | A | * | 6/1973 | Maurer ............................. 5/417 |
| 4,447,991 | A | * | 5/1984 | Landgraf et al. ................ 451/41 |
| 4,682,003 | A | * | 7/1987 | Minakawa et al. ...... 219/121.72 |
| 5,653,900 | A | * | 8/1997 | Clement et al. .......... 219/121.68 |
| 5,742,026 | A | * | 4/1998 | Dickinson et al. ....... 219/121.69 |
| 6,518,541 | B1 | | 2/2003 | Kelly |
| 6,734,392 | B2 | * | 5/2004 | Philipp et al. ............ 219/121.82 |
| 2005/0223744 | A1 | * | 10/2005 | Horisaka et al. .................. 65/61 |
| 2006/0102608 | A1 | * | 5/2006 | Katsuta et al. ........... 219/121.83 |

FOREIGN PATENT DOCUMENTS

| | | |
|---|---|---|
| DE | 3207274 CA | 3/1982 |
| DE | 4132817 A1 | 10/1991 |
| DE | 10 2004 033981 A1 | 9/2005 |
| GB | 2 078 621 A | 1/1982 |
| JP | 08 143321 A | 6/1996 |
| KR | 1020010057008 | 7/2001 |

* cited by examiner

*Primary Examiner* — Jodi C Franklin
(74) *Attorney, Agent, or Firm* — Occhiuti & Rohlicek LLP

(57) ABSTRACT

The method for polishing glass products, comprises the following steps:
specifying a contour or form or shape of the glass product;
detecting the location or position of the glass product;
calculating a path for a laser beam on the basis of the contour of the glass product and the location of the glass product; and
scanning the path with the laser beam for polishing the glass product in order to fuse mold joints together or smoothen/polish them.

13 Claims, 5 Drawing Sheets

METHOD AND APPARATUS FOR REMOVING THE GLASS MOULD JOINTS INCLUDING POLISHING THE JOINTS, AND GLASS PRODUCT MACHINED THEREBY

CROSS-REFERENCE TO RELATED APPLICATIONS

This application claims priority to German Application No. 10 2008 011 808.7-45 filed on Feb. 29, 2008. The contents of which are hereby incorporated by reference in its entirety.

The invention relates to a method and an apparatus for removing the glass mould joints on a glass product including polishing the joints, and a glass product machined thereby.

Nowadays, the machine fabrication of glass products, such as drinkware, is mainly performed by pressing. In the process, molten glass is pressed into a press mould by means of a plunger. Due to separation lines of individual mouldings and the press plunger, different joints or seams form on the finished glass product depending on the fabrication method, such as a so-called facet juncture, ring joint (-seam), assemble joint (-seam), stem joint (-seam) or base joint (-seam). A base and stem joint of a goblet in particular can be recognized by a layman as well and gives the impression of a bad quality of the glass product. Therefore, the joints created by pressing are heated and smoothened by means of a gas burner. However, this process is energy-consuming and difficult to manage. Thus, there is the need for an improvement of the smoothening process or polishing process of pressed glass products.

It is therefore the object of the invention to provide an improved polishing method by means of which mould joints on the glass products created by pressing can be made substantially invisible and by means of which a plurality of glass products can be machine polished. Furthermore, a corresponding apparatus for polishing glass products and a glass product polished therewith is to be provided.

This object is achieved by a method and an apparatus having the features of the independent claims. Advantageous embodiments of the invention are defined in the dependent claims.

The method for polishing glass products comprises the following steps:
specifying a contour or form or shape of the glass product;
detecting the location or position of the glass product;
calculating a path for a laser beam on the basis of the contour of the glass product and the location of the glass product; and
scanning the path with the laser beam for polishing the glass product in order to fuse mould joints together or smoothen/polish them.

By calculating the path for a laser beam on the basis of the location of the glass product and the specified contour of the glass product, the laser beam can be guided exactly along the mould joint in order to fuse the mould joint and make it substantially invisible. Since the laser has a high energy density, the heating and fusion of the mould joint can be performed in specific areas of the glass product in a targeted fashion. Unnecessary heating of adjacent areas of the glass product is largely avoided. Thereby, an excellent smoothing of the mould joint is achieved with minimum energy expenditure.

Preferably, the glass products are placed or positioned and transported on a conveyor belt, and the conveyor belt is further preferably continuously moved in order to polish a plurality of glass products arranged on the conveyor belt during movement of the conveyor belt.

By performing the polishing process of the glass product during the continuous movement of the conveyor belt, a great number of pieces may be machined per unit of time. A discontinuous machining is avoided, which positively influences previous and subsequent machining stations of the glass product. In other words, a plurality of pressed glasses fed from a press station to the polishing station may be polished continuously in order to be transported further continuously, for example to a cooling and/or packing station.

Preferably, the method further comprises the step of aligning the glass product on the conveyor belt such that an area of the glass product to be polished is arranged in a horizontal plane at an angle different from 0° and 180°, preferably substantially rectangular or normal or perpendicular with respect to a transport direction of the conveyor belt.

By aligning the glass products on the conveyor belt such that the area to be polished, i.e. a stem joint and a base joint, is aligned rectangular or transverse to the transport direction of the conveyor belt, excellent accessibility of a laser beam to the area of the glass product to be polished is ensured. Thus, the laser beam may start the polishing process before the glass product passes the laser device, and may also be machined further by the laser beam after passing the laser device. In other words, if the laser beam is initially directed onto the glass mould joint at a substantially acute angle by the laser device, during the movement of the conveyor belt and accordingly the movement of the glass product toward the laser device, the machining angle of the laser beam becomes more and more obtuse to finally assume a right angle (90°). When the glass product is finally moved away from the laser device due to the movement of the conveyor belt, the right angle in turn changes to an acute angle from an initially obtuse angle. That means, the laser beam follows the movement of the glass product on the conveyor belt. Thus, it is not necessary to stop or delay the conveyor belt. Instead, the glass product is produced by the laser beam during the continuous movement of the conveyor belt.

Further preferably, the method comprises the further step of loading the contour of the glass product as a CAD file (computer aided design) into a processor or computer.

Preferably, the step of detecting the location of the glass product further comprises detecting at least two specified lines on the glass product.

By storing and detecting the location of the glass product by at least two specified lines on the glass product preferably as a CAD file, the location of the glass product on the conveyor belt may be detected with high precision. Additionally or alternatively, the glass product may be aligned on the conveyor belt at least within a specified area for example by a robot arm.

Further preferably, the location of the glass product is detected by means of at least an optical sensor, a laser scanner and/or a CCD camera.

Further preferably, the method comprises the further step of machining the glass product with a laser from two substantially opposite sides substantially transverse to the transport direction of the conveyor belt.

Preferably, the method comprises the further steps of:
arranging a stemware glass on the conveyor belt, with a cup or cap of the stemware glass facing downward; and
machining a stem joint and/or a base joint of the stemware glass by means of a laser.

By arranging the stemware glass with its cup or cap on the conveyor belt, the specified lines on the glass base can be detected particularly well if e.g. the above-mentioned optical sensor is arranged above the conveyor belt preferably such that the glass product passes below the optical sensor. In addition, the glass stands very stable with its cup or cap on the conveyor belt. Furthermore, no additional heat removal occurs on the hot glasses by pick-up devices or the like. By means of this method, up to 60 glasses per minute may be laser polished on the conveyor belt depending on the glass contour.

The apparatus for polishing glass products comprises the following:
a memory for storing a specified contour of the glass product;
a location detecting device for detecting the location of the glass product;
a laser device for generating a laser beam to machine the glass product;
a calculating device for calculating a path for the laser beam on the basis of the contour of the glass product and the location of the glass product.

Preferably, the apparatus for polishing glass products further comprises a conveyor belt for transporting the glass product in order to polish a plurality of glass products arranged on the conveyor belt during the movement of the conveyor belt.

Further preferably, at least an optical sensor, a laser scanner and/or a CCD camera is provided in the apparatus as a location detecting device for detection the location of the glass product.

Preferably, two laser devices are arranged on substantially opposite sides substantially transverse to the transport direction of the conveyor belt in order to simultaneously machine the glass product from two sides.

Furthermore, if two laser devices are arranged on substantially opposite sides of the apparatus, the glass product can be simultaneously machined from two sides. This is particularly advantageous in the machining of stem and base joints which substantially form on two opposite sides of the glass base and the glass stem. Due to the continuous movement of the glass products without additional pick-up devices on the conveyor belt, the construction of a corresponding apparatus is very simple and investment costs are low. Moreover, due to the simple construction, the apparatus is dimensioned relatively small in order to occupy only little space in a production hall.

In addition, a glass product, in particular drinkware, is produced in which at least a glass mould joint has been polished by means of a laser. Preferably, the glass product, such as a stemware glass, is polished by means of a method as described above and/or an apparatus as described above. Due to the polish of the glass product by means of the above-described method, glass mould joints are hardly visible any more, i.e. the finished glass product obtains a preferred high-quality appearance such as if it had been produced without the formation of glass mould joints.

Subsequently, an exemplary embodiment is explained in further detail with reference to the accompanying drawings.

Figure 4:
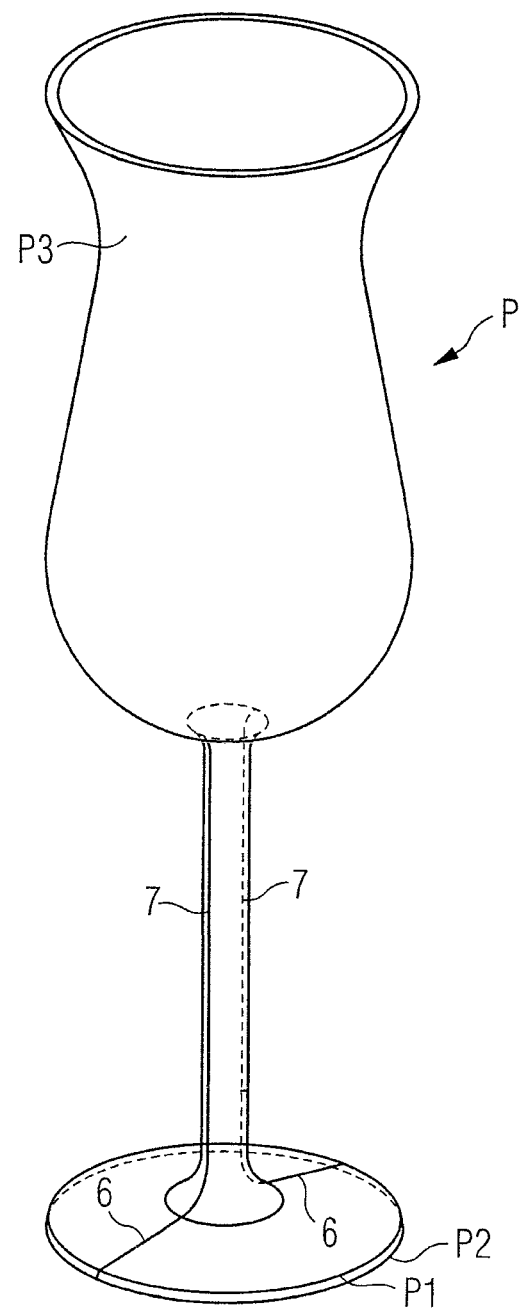
FIG. 4 shows drinkware as an exemplary glass product on which laser polishing is to be performed.
Figure 5:
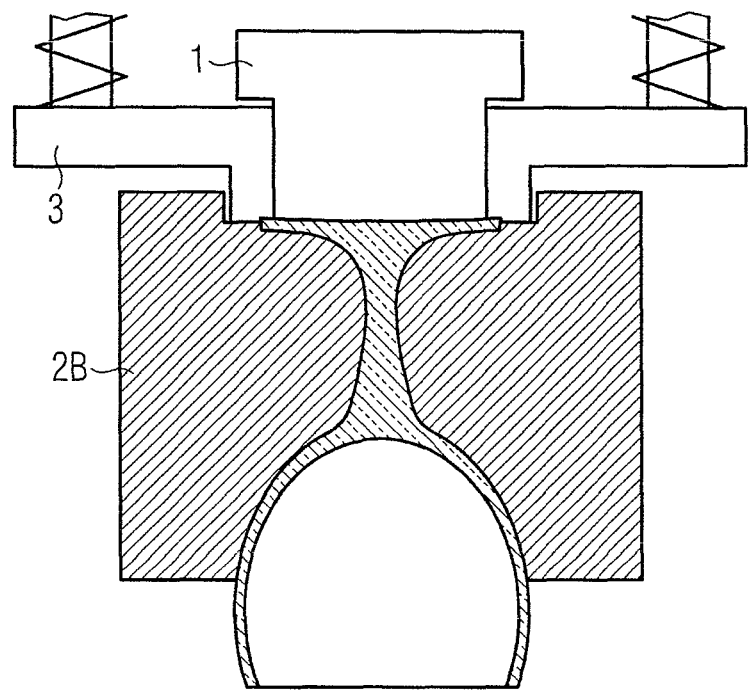
FIG. 5 shows a two-part press mould for pressing drinkware.
Figure 6:
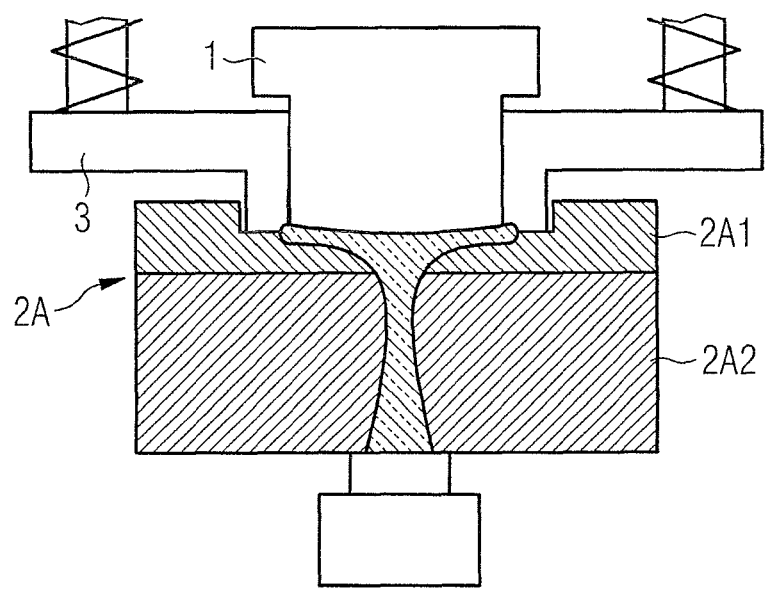
FIG. 6 shows a three-part press mould for pressing a base with stem for drinkware.

As is shown in FIG. 5, a glass is pressed into a glass mould 2B by means of a plunger 1 during a pressing process. This mould 2B consists of two parts in order to be able to take the glass out of the mould 2B after pressing. Due to the two-part form of the mould 2B, a base joint 6 and a stem joint 7 are created, as is shown in FIG. 4. FIG. 6 shows a three-part mould 2A1, 2A2 for preventing the base joint 6. The upper part of the mould 2A1 consists of one part, and the base with stem is upwardly taken out of the mould 2A1 after pressing after the two-part mould 2A2 has been separated. Thereby, the base joint 6 can be prevented, but the stem joint 7 cannot be prevented due to the two-part form of the second part of the mould 2A2. In addition, a further pressing process or blowing process must be carried out in order to press the stem with base onto an upper glass part, the so-called bowl, or to blow it up. Thereby, a further joint forms, the so-called assemble joint.

The inventive method substantially serves for polishing and smoothening the base joint 6 and the stem joint 7. Depending on the application, it is also possible, however, to polish other joints created on a glass product by pressing of the glass product by means of the inventive method.

Figure 1:
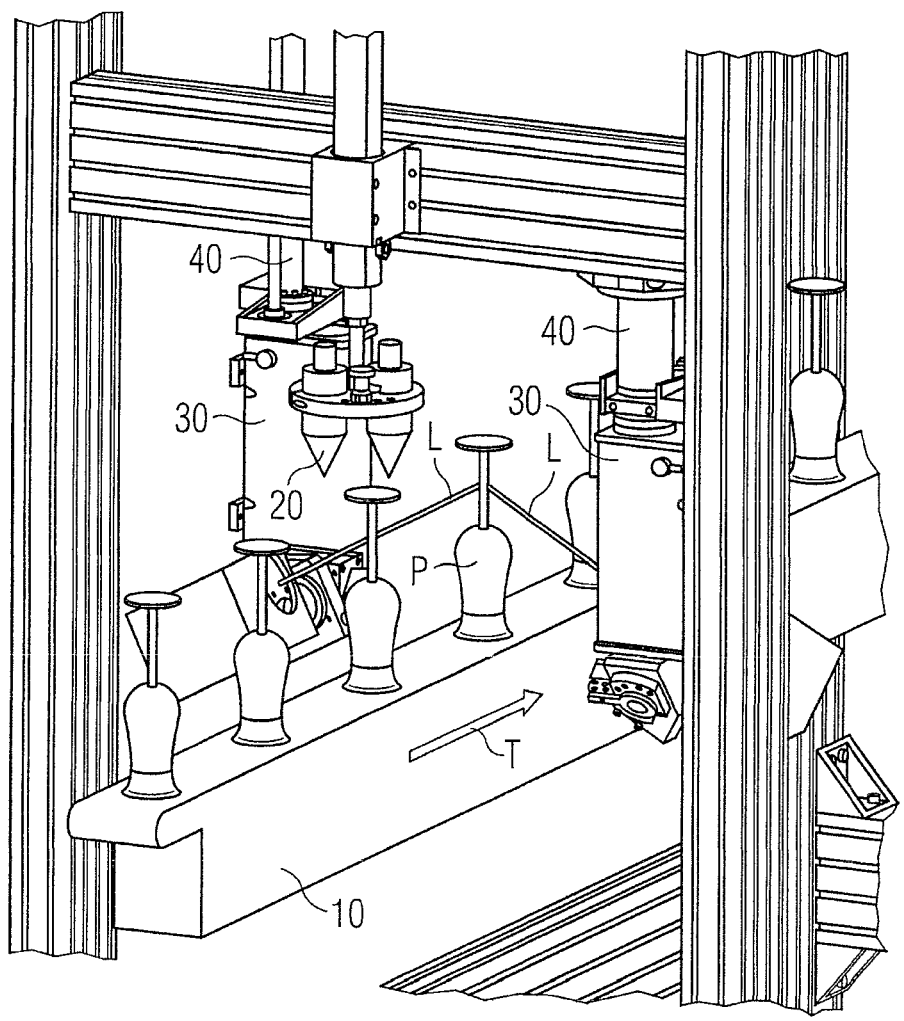
FIG. 1 shows a perspective view of the apparatus for polishing glass products, such as a conveyor belt, on which glass products are transported.

As is shown in FIG. 1, the pressed glass products P are placed onto a conveyor belt T, without the conveyor belt being provided with a pick-up device, a gripper, a receiving pot or the like. This offers the advantage that heat still present in the glass product P is not dissipated so quickly to surrounding components. In other words, the glass product P remains very hot during transportation on the conveyor belt T.

The conveyor belt passes along one or preferably a pair of laser devices 30, 30. The laser devices 30, 30 arranged in pairs are preferably arranged on two opposite sides substantially rectangular with respect to a transport direction of the conveyor belt T. However, the laser devices 30, 30 may also be arranged in an offset manner in the transport direction T. In addition, the laser devices 30, 30 are provided with corresponding tiltable or movable mirrors (not shown) in order to continue guiding a laser beam L during the movement of the glass product P on the conveyor belt T and moving the laser beam in a height direction of the glass product P.

Figure 2:
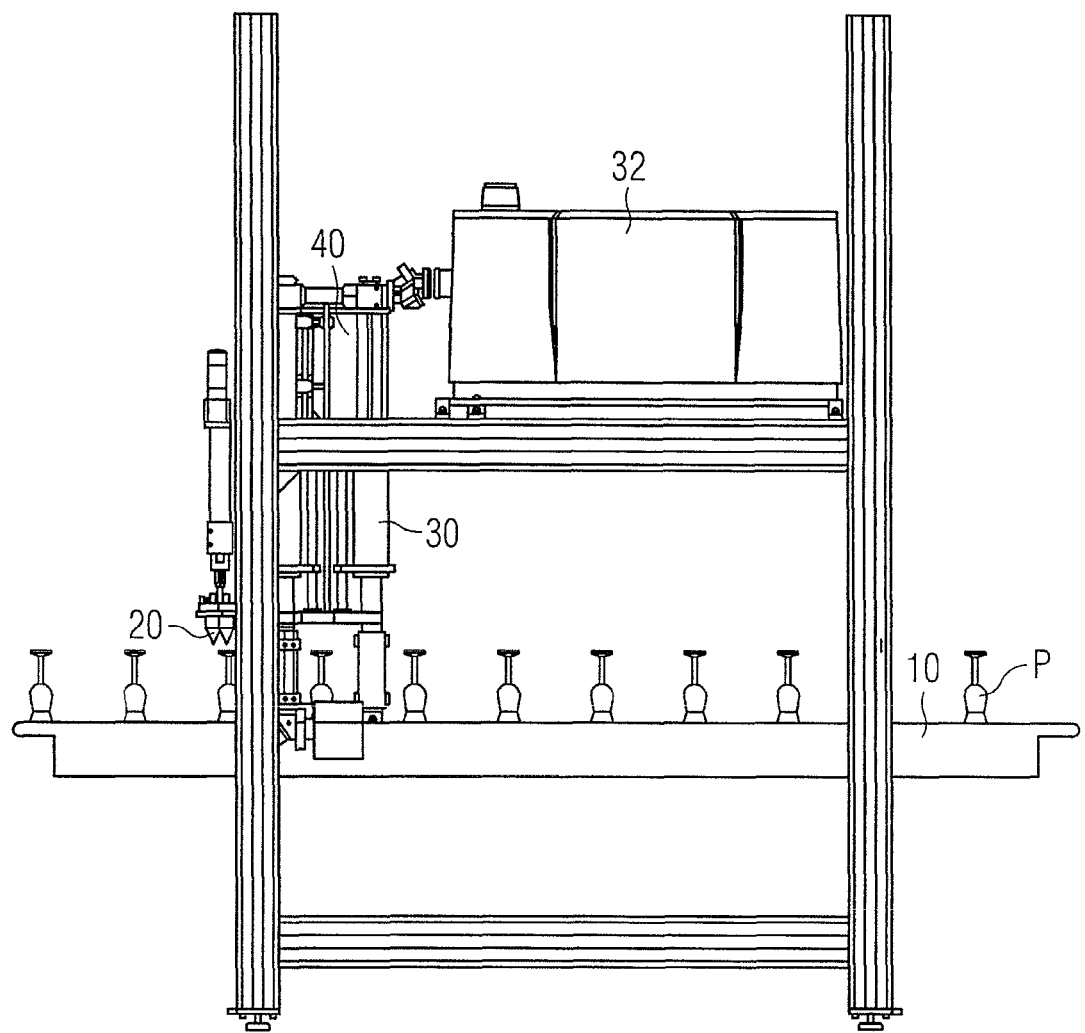
FIG. 2 shows a side view of the apparatus of FIG. 1.
Figure 3:
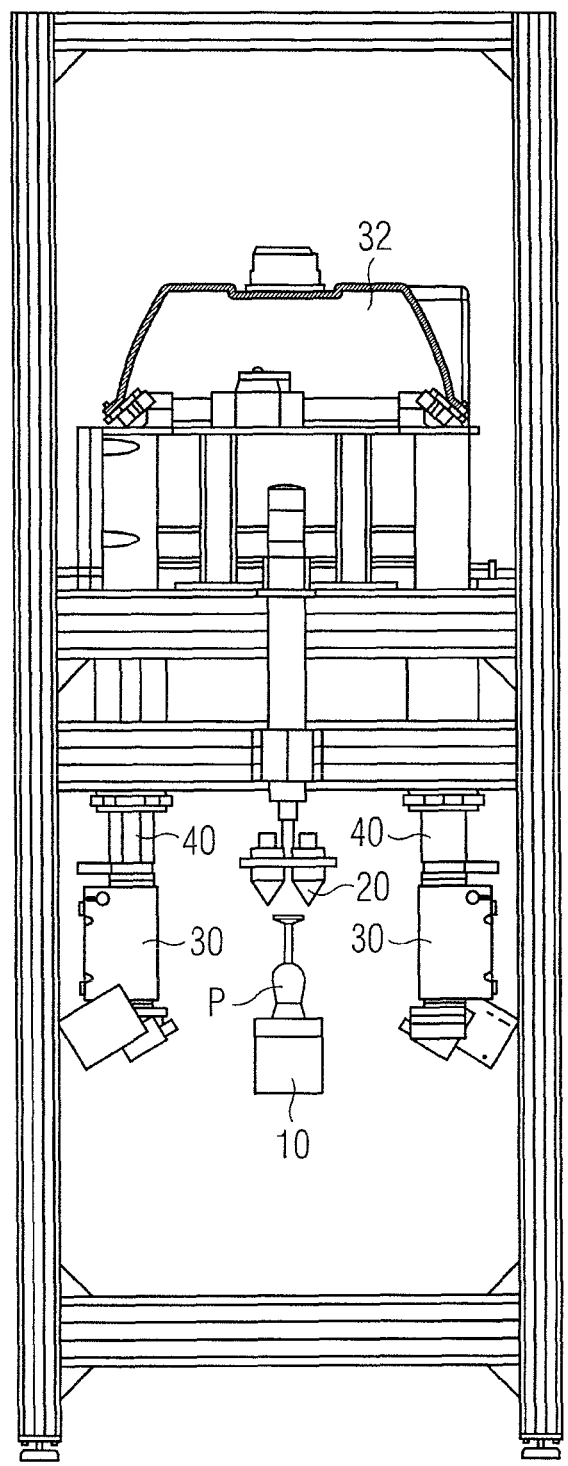
FIG. 3 shows a front view of the apparatus of FIG. 1.

In other words, the laser beam L can both be moved in the horizontal direction in FIG. 1 and in the vertical direction. For generating the laser beam, the apparatus is further provided with a $CO_2$ laser 32 generating the laser beams L, L for both laser devices 30, as is shown in FIGS. 2 and 3.

Furthermore, the apparatus is provided with a location detecting device 20 capable of detecting a location or position of the glass products P on the conveyor belt 10. This location detecting device 20 may be an optical sensor, a CCD camera, a laser device, a scanner or the like. Moreover, a movement device 40 is provided in order to adjust the apparatus or glass machining line, during a modification of same, to different glass heights by adjusting or offsetting the location detecting device 20 or scanner unit by means of the movement device 40.

Preferably, this location detecting device 20 detects specified lines or contours or shapes of the known glass product P in order to detect the location on the conveyor belt 10. For example, these specified lines may be two mutually parallel, virtual or specified lines measured by the location detecting device 20. However, lines on the upper glass portion, i.e. the bowl, may also be used for a precise location detection of the glass product P.

In order to obtain a stable arrangement, the glass products P are placed onto the conveyor belt 10 preferably with the upper glass portion facing downward. However, it is also possible to place the glass products P with the base onto the conveyor belt 10. However, the arrangement in a reverse position of use, i.e. with the bowl facing downward, offers the advantage that the specified lines P1, P2 may be passed directly along the location detecting device 20 in order to conduct a particularly precise location detection on the conveyor belt 10.

A calculating device (not shown) e.g. within a computer system, calculates the location and alignment, i.e. the inclination, of the glass products P on the conveyor belt T on the basis of the measurement data measured by the location detecting device 20. On the basis of the specified glass contour and the thus obtained location information, the machining path of the laser L, L is calculated separately for each glass product P in order to carry out polishing of a base joint 6 and a stem joint 7 on the glass product P.

The movement path of the laser beam L will substantially be along the base joint 6 and subsequently along the stem joint 7. That means, the area of the base joint 6 and the stem joint 7 on the glass product P is heated and fused together by means of the laser beam L in order to carry out a polishing process so that the joints 6, 7 are no longer visible on the finished glass product P.

Since the glass products P move past the laser device 30 or the pair of laser devices 30, 30 at the continuous speed of the conveyor belt 10, the laser beam L or the laser beams L, L must be moved together with the moving glass products P. In other words, the laser irradiation of a glass product P starts before the glass product P passes the laser device 30, by directing the laser beam L onto the glass product P at a substantially acute angle with respect to the transport direction T.

This angle between the transport direction T and the laser beam L is e.g. 30 degrees. Depending on the application, this angle may vary between 20 and 60 degrees. Due to the tracking of the laser beam L, the angle becomes more and more obtuse during the movement of the conveyor belt 10 until it assumes a right angle with respect to the transport direction T of the conveyor belt 10 when the glass product P has reached the laser device 30. After that, the angle becomes more acute again to subsequently reassume approximately 30 degrees or an acute angle in the range between 20 and 60 degrees.

Then, the next glass product P will be machined by the laser beam L. Due to the continuous machining of the glass products P during the continuous movement of the conveyor belt 10, a continuous machining of glass products P can be achieved. In this way, up to 60 glasses per minute may be lasered. A heat input into the glass product P to be machined is limited to the area of the base joint 6 and the stem joint 7 to be machined in a targeted manner. Unnecessary energy losses and deformations in the glass are avoided. Moreover, since the glass is still hot after pressing and heat removal is avoided by leaving out corresponding pick-up devices, grippers, etc., the glass strain created in the glass is minimized due to the laser polishing.

Furthermore, due to laser polishing in the hot state of the glass, an optically specifically preferred polishing of the glass mould joints is achieved, which is substantially no longer visible on the finished glass product P.

The movement device 40 of the laser device 30 preferably comprises an electric motor, a servo motor or the like, and a corresponding gearbox in order to adjust the location detecting device 20 during modification.

In addition, the laser device 30 preferably comprises the mirror (not shown) in order to move the laser beam L generated by the $CO_2$ laser 32 in the vertical direction along the stem joint and base joint 6, 7 of the glass product P. Alternatively however, the laser beam L may in turn be moved by means of a servo motor, gearbox, etc. in the vertical direction. Moreover, as an alternative, a pair of $CO_2$ lasers 32 may be arranged on opposite sides of the conveyor belt 10, which exhibit a corresponding movability in order to move the laser beam L along the movement path calculated by the calculating device.

Although the continuous movement of the conveyor belt 10 is described in the embodiment, the invention can also be applied if the conveyor belt 10 is moved discontinuously or with interruptions. Depending on which mould joint on a glass product P is to be lasered or polished, a discontinuous movement of the conveyor belt 10 may turn out to be advantageous. In addition, instead of a laser 30 or a pair of lasers 30, 30, a plurality of lasers may be arranged along the transport direction T of the conveyor belt 10 and/or vertically on top of each other.

An alignment of the laser device 30 with the conveyor belt 10 is not necessary, since the location of the glass product P on the conveyor belt 10 can be precisely detected by means of the optical location detecting device 20. The calculating device, not shown, for calculating the movement path of the laser beam L can calculate the movement path on the basis of the detected location of the glass product P and the known and specified contour of the glass product P. The contour of the glass product P and known specified lines P1, P2 are stored in the calculating device preferably as a CAD file. Additionally or alternatively, a specified alignment of the glass product on the conveyor belt 10 may e.g. be performed by means of a robot arm as well.

Although the present invention has been exemplarily explained on the basis of the polishing of drinkware, the inventive method and apparatus may also be applied to other pressed glass products. Moreover, polishing or machining of glass products P may also be performed to achieve specific desired effects on the glass products P. It does not exclusively concern the polishing of mould joints on glass products P. Any other type of laser machining may be performed on a glass product P by means of the inventive method and apparatus.

Preferably, the laser device 30 is accommodated with the movement device 40 and the $CO_2$ laser 32 in a common support, as is shown in the figures. In addition, the location detecting device 20 is preferably attached to the same support or frame. However, these apparatuses and devices may also be arranged or positioned separately from each other, depending on the application. Although the polishing of glass mould joints is described herein, a different type of laser machining may be performed on glass products by means of the method and apparatus as well, such as cutting, engraving, etc.

LIST OF REFERENCE NUMERALS

1 plunger
2A two-part press mould
2B one-part press mould
3 ring
6 base joint
7 stem joint
10 conveyor belt
20 location detecting device
30 laser device
32 $CO_2$ laser
40 movement device
L laser beam
P glass product
T transport direction

The invention claimed is:
1. A method for polishing glass products, comprising:
 specifying a contour of a glass product;
 transporting the glass product on a conveyor belt;

continuously moving the conveyor belt;
detecting the location of the glass product on the conveyor belt;
calculating a path for a laser beam on the basis of the contour of the glass product and the location of the glass product;
scanning the path with the laser beam for polishing the glass product; and
loading the contour of the glass product into a computer as a CAD file.

2. The method according to claim 1, wherein continuously moving the conveyor belt includes continuously moving the conveyor belt in order to polish a plurality of glass products arranged on the conveyor belt during movement of the conveyor belt.

3. The method according to claim 1, further comprising the step of aligning the glass product on the conveyor belt such that an area of the glass product to be polished is arranged in a horizontal plane at an angle different from 0° and 180°, preferably substantially rectangular with respect to a transport direction of the conveyor belt.

4. The method according to claim 1, wherein the step of detecting the location of the glass product further comprises detecting at least two lines on the glass product.

5. The method according to claim 1, wherein the location of the glass product is detected by means of at least an optical sensor, a laser scanner or a CCD camera.

6. The method according to claim 1, further comprising the step of machining the glass product with a laser from two substantially opposite sides substantially transverse to the transport direction of the conveyor belt.

7. The method according to claim 1, further comprising the steps of:
arranging a stemware glass on the conveyor belt, with a cup of the stemware glass facing downward; and
machining a stem joint and/or a base joint of the stemware glass by means of laser.

8. The method of claim 1, wherein scanning the path with the laser beam includes continuously moving the glass product past a laser generating the laser beam.

9. A method for polishing glass products, comprising:
passing a glass workpiece along a transport system, the workpiece having a predetermined path on the surface of the surface of the workpiece;
controlling targeting of a radiation emitting device that is fixed relative to the transport system, including varying a direction of emitted radiation according to tracked motion of the workpiece passing along the transport system and according to the predetermined path on the surface of the workpiece; and
emitting radiation from the radiation emitting device in the varying direction to cause heating of the workpiece along the predetermined path while the workpiece passes along the transport system, wherein emitting the radiation comprises emitting the radiation at a varying angle of incidence to the workpiece.

10. The method of claim 9 wherein controlling the targeting comprises tracking the motion of the workpiece passing along the transport system.

11. The method of claim 9 wherein controlling the targeting is performed according to configuration data characterizing a shape of the workpiece.

12. The method of claim 9 wherein passing the glass workpiece along the transport system comprises continuously passing the workpiece along a conveyor belt system.

13. The method of claim 9 wherein the radiation emitting device comprises one or more Lasers.

* * * * *